United States Patent Office 3,158,609
Patented Nov. 24, 1964

3,158,609
DIPHENYLMETHYL-1-AMINOPIPERIDINE
HYDRAZONES AND CONGENERS
Robert W. Hamilton, Wilmette, and Kurt J. Rorig, Glenview, Ill., assignors to G. D. Searle & Co., Chicago, Ill., a corporation of Delaware
No Drawing. Filed Jan. 2, 1963, Ser. No. 248,873
11 Claims. (Cl. 260—240)

This invention relates to diphenylmethyl-1-aminopiperidine hydrazones and congeners. More particularly, this invention provides new and useful chemical compounds of the formula

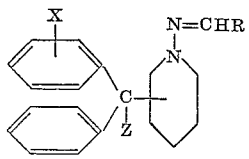

wherein X represents hydrogen or a halogen, especially chlorine; Z represents hydrogen or hydroxyl; and R represents an alkyl, optionally-substituted mono- or bicyclic aryl, or unsaturated heterocyclic radical.

Preferred embodiments of this invention are compounds having the foregoing formula wherein R represents a lower alkyl radical, for example, methyl, ethyl, propyl, isopropyl, butyl, isobutyl, sec-butyl, tert-butyl, pentyl, neopentyl, hexyl, isohexyl, or like $C_nH_{2n+1}$ group wherein $n$ represents a positive integer less than 7.

Other preferred embodiments of the invention are compounds having the foregoing formula wherein R represents an optionally-substituted mono- or bicyclic aryl radical, for example, a phenyl or naphthyl radical in which hydrogen can be replaced, if desired, by one or more hydroxy, methylenedioxy, cyano, or dialkylaminoalkoxy groups. Especially preferred embodiments of this type are those wherein R in the above formula represents a phenyl, hydroxyphenyl, 3,4-methylenedioxyphenyl, 2-hydroxy-1-naphthyl, cyanophenyl, or diethylaminoethoxyphenyl radical.

Still other preferred embodiments of this invention are compounds having the foregoing formula wherein R represents an unsaturated heterocyclic radical, for example, a pyridyl, 4-quinolyl, or thienyl group.

The compounds to which this invention relates are useful by reason of their valuable pharmacological properties. Thus, for example, they are anticonvulsant, hypocholesterolemic, and antihypercholesterolemic agents.

Manufacture of the subject compounds proceeds by heating an amine of the formula

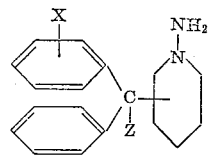

with an aldehyde of the formula

in an inert solvent such as benzene, there being acetic acid present where it is desired to catalyze the reaction. (The meanings of X, Z, and R in the latter two formulas remain as before.) Water is separated and removed as formed in process if immiscible with the solvent employed.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of material and of methods, may be practiced without departing from the purpose and intent of this disclosure. Throughout the examples hereinafter set forth, temperatures are given in degrees centigrade and relative amounts of materials in parts by weight, except as otherwise noted.

Example 1

(A) *4-(p-chloro-α-phenylbenzyl)piperidine.*—A solution of 14 parts of 4-(p-chloro-α-phenylbenzyl)pyridine in 250 parts of acetic acid is heated, with agitation, at 47° under approximately 4 atmospheres of hydrogen and in the presence of 2 parts of platinum oxide catalyst for 2 hours. The resultant mixture is filtered, and the filtrate is stripped of solvent by vacuum distillation. The residue is poured into 3 volumes of ice water, and the mixture thus obtained is made alkaline with sodium hydroxide. This mixture, in turn, is extracted with ether. The ether extract, dried over anhydrous potassium carbonate and thereupon stripped of solvent by vacuum distillation, affords as the residue, 4-(p-chloro-α-phenylbenzyl)piperidine.

(B) *4-(p-chloro - α - phenylbenzyl)piperidine hydrochloride.*—To a solution of approximately 14 parts of 4-(p-chloro-α-phenylbenzyl)piperidine in 100 parts of butanone is added just sufficient 2-propanolic hydrogen chloride to render the solution acid. The precipitate thrown down is 4-(p-chloro-α-phenylbenzyl)piperidine hydrochloride which, filtered off and dried in air, melts at 216–219° (with gas evolution).

(C) *4-(p-chloro-α-phenylbenzyl) - 1 - nitrosopiperidine.*—To a solution of 98 parts of 4-(p-chloro-α-phenylbenzyl)piperidine hydrochloride in a mixture of 56 parts of water with 225 parts of ethanol at 70° is added, during 1 hour and with continuing agitation, a solution of 44 parts of sodium nitrite and 88 parts of water. Concurrently, sufficient concentrated hydrochloric acid is introduced to insure that the reaction mixture is slightly acid throughout the course of the sodium nitrite addition. When the addition is complete, the reaction mixture is cooled to around 0°; and the insoluble solids are thereupon filtered off and taken up in benzene. The benzene solution is washed with dilute hydrochloric acid, dried over anhydrous calcium sulfate, and stripped of solvent by vacuum distillation. The residue solidifies on standing and melts at 160–165°. The product thus isolated is 4-(p-chloro-α-phenylbenzyl)-1-nitrosopiperidine.

(D) *1-amino - 4 - (p-chloro - α - phenylbenzyl)piperidine.*—To a solution of 70 parts of lithium aluminum hydride in 10,000 parts of ether at the boiling point under reflux is added, with agitation during 45 minutes, a solution of 360 parts of 4-(p-chloro-α-phenylbenzyl)-1-nitrosopiperidine in 2000 parts of tetrahydrofuran. Agitation is continued for 1 hour after the addition is complete, at which point 74 parts of water and a mixture of 55 parts of aqueous 20% sodium hydroxide with 74 parts of water are consecutively mixed in. The mixture is filtered, and the solids thus separated are washed with hot tetrahydrofuran and discarded. Filtrate and washings are combined and stripped of solvent by vacuum distillation. The residue is taken up in benzene, and the benzene solution is extracted with dilute hydrochloric acid. The acid extract is made alkaline with aqueous sodium hydroxide, and the resultant mixture is extracted with ether. The ether extract, dried over anhydrous potassium carbonate and stripped of solvent by distillation, affords 1 - amino-4-(p-chloro-α-phenylbenzyl)piperidine as the residue, which is a light brown oil.

(E) *1-amino - 4 - (p-chloro - α - phenylbenzyl)piperidine hydrochloride.*—An ethereal solution of 1-amino-4-(p-chloro-α-phenylbenzyl)piperidine, made slightly acid with 2-propanolic hydrogen chloride, affords 1-amino-4-

(p-chloro-α-phenylbenzyl)piperidine hydrochloride as a colorless crystalline precipitate which, filtered off and dried in air, sinters at 167° and melts at 171° (with gas evolution).

(F) *4-(p - chloro-α-phenylbenzyl)-1-ethylideneaminopiperidine.*—A mixture of 60 parts of 1-amino-4-(p-chloro-α-phenylbenzyl)piperidine, 12 parts of acetaldehyde, and 2500 parts of benzene is heated at the boiling point under reflux for 1 hour, water being removed as formed in process. The resultant mixture is stripped of solvent by vacuum distillation, and the residue is taken up in a minimum of boiling ethanol. From the ethanol solution, on cooling, precipitates crystalline 4-(p-chloro-α-phenylbenzyl) - 1 - ethylideneaminopiperidine which, filtered off and recrystallized from ethanol, melts at 124–126°. The product has the formula

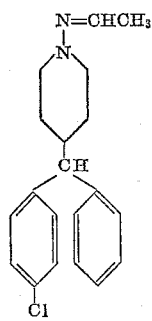

*Example 2*

(A) *α-(p-chlorophenyl)-α-phenyl - 3 - pyridinemethanol.*—To a solution of 92 parts of 3-benzoylpyridine in 800 parts of ether is added, during 1 hour with continuous agitation at room temperatures, a solution of 103 parts of p-chlorophenylmagnesium bromide in 300 parts of ether. To the resultant mixture is added a solution of 104 parts of ammonium chloride in 416 parts of water. The solid precipitate thrown down is α-(p-chlorophenyl)-α-phenyl-3-pyridinemethanol, which is isolated by filtration and further purified by washing with water.

(B) *3-(p-chloro-α-phenylbenzyl)pyridine.*—A mixture of 30 parts of α-(p-chlorophenyl)-α-phenyl-3-pyridinemethanol, 60 parts of glacial acetic acid, 18 parts of concentrated hydrochloric acid, and 60 parts of 47% hydriodic acid is heated at the boiling point under reflux for 2 minutes, then thoroughly mixed into a solution of 24 parts of sodium hydrosulfite in 180 parts of water. The resultant mixture is made alkaline with dilute sodium hydroxide and then extracted with ether. The ether extract is dried over anhydrous potassium carbonate and stripped of solvent by distillation. The residue is taken up in 1000 parts of hexane, and the hexane solution is seeded with α-(p-chlorophenyl)-α-phenyl-3-pyridinemethanol to precipitate any unreacted starting material. After 24 hours at 0°, the hexane solution is filtered; and the filtrate is stripped of solvent by vacuum distillation. The residual oil is the desired 3-(p-chloro-α-phenylbenzyl)pyridine.

(C) *3-(p-chloro-α-phenylbenzyl)piperidine.*—Substitution of 14 parts of 3-(p-chloro-α-phenylbenzyl)pyridine for the 4-(p-chloro-α-phenylbenzyl)pyridine called for in Example 1A affords, by the procedure there detailed, 3-(p-chloro-α-phenylbenzyl)piperidine.

(D) *3-(p-chloro-α-phenylbenzyl)piperidine hydrochloride.*—Substitution of 14 parts of 3-(p-chloro-α-phenylbenzyl)piperidine for the 4-(p-chloro-α-phenylbenzyl)piperidine called for in Example 1B affords, by the procedure there detailed, 3-(p-chloro-α-phenylbenzyl)piperidine hydrochloride.

(E) *3-(p-chloro-α-phenylbenzyl)-1-nitrosopiperidine.*—Substitution of 98 parts of 3-(p-chloro-α-phenylbenzyl)piperidine hydrochloride for the 4-(p-chloro-α-phenylbenzyl)piperidine hydrochloride called for in Example 1C affords, by the procedure there detailed, 3-(p-chloro-α-phenylbenzyl)-1-nitrosopiperidine.

(F) *1-amino-3-(p-chloro-α-phenylbenzyl)piperidine.*—Substitution of 360 parts of 3-(p-chloro-α-phenylbenzyl)-1-nitrosopiperidine for the 4-(p-chloro-α-phenylbenzyl)-1-nitrosopiperidine called for in Example 1D affords, by the procedure there detailed, 1-amino-3-(p-chloro-α-phenylbenzyl)piperidine.

(G) *3-(p-chloro-α-phenylbenzyl)-1-ethylideneaminopiperidine.*—Substitution of 60 parts of 1-amino-3-(p-chloro-α-phenylbenzyl)piperidine for the 1-amino-4-(p-chloro-α-phenylbenzyl)piperidine called for in Example 1F affords, by the procedure there detailed, 3-(p-chloro-α-phenylbenzyl)-1-ethylideneaminopiperidine, having the formula

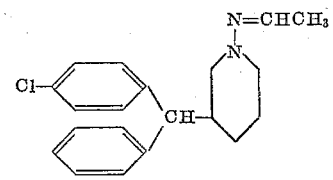

*Example 3*

(A) *2-(p-chloro-α-phenylbenzyl)-1-nitrosopiperidine.*—Substitution of 98 parts of 2-(p-chloro-α-phenylbenzyl)piperidine hydrochloride for the 4-(p-chloro-α-phenylbenzyl) piperidine hydrochloride called for in Example 1C affords, by the procedure there detailed, 2-(p-chloro-α-phenyl-benzyl)-1-nitrosopiperidine.

(B) *1-amino-2-(p-chloro-α-phenylbenzyl)piperidine.*—Substitution of 360 parts of 2-(p-chloro-α-phenylbenzyl)-1-nitrosopiperidine for the 4-(p-chloro-α-phenylbenzyl)-1-nitrosopiperidine called for in Example 1D affords, by the procedure there detailed, 1-amino-2-(p-chloro-α-phenylbenzyl)piperidine.

(C) *2-(p-chloro-α-phenylbenzyl)-1-ethylideneaminopiperidine.*—Substitution of 60 parts of 1-amino-2-(p-chloro-α-phenylbenzyl)piperidine for the 1-amino-4-(p-chloro-α-phenylbenzyl)piperidine called for in Example 1F affords, by the procedure there detailed, 2-(p-chloro-α-phenylbenzyl)-1-ethylideneaminopiperidine, having the formula

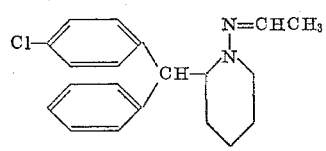

*Example 4*

*1-benzylideneamino - 4 - diphenylmethylpiperidine.*—A mixture of 100 parts of 1-amino-4-diphenylmethylpiperidine, 41 parts of benzaldehyde, and 5000 parts of benzene is heated at the boiling point under reflux for 1 hour, water being removed as formed in process. The mixture is then concentrated by vacuum distillation to approximately 1/10 the original volume, whereupon hexane is added to the point of incipient precipitation and the resultant mixture cooled at 0° while precipitation occurs. The precipitate is isolated by filtration and recrystallized from a mixture of benzene and hexane to give 1-benzylideneamino-4-diphenylmethylpiperidine sintering at 150° and melting at 155–157°. The product has the formula

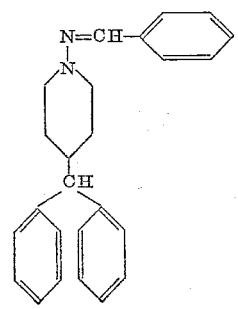

Example 5

*1-benzylideneamino-4-(p-chloro-α-phenylbenzyl)-piperidine.*—A mixture of 60 parts of 1-amino-4-(p-chloro-α-phenylbenzyl)piperidine, 22 parts of benzaldehyde, and 2500 parts of benzene is heated at the boiling point under reflux for 1 hour, water being removed as formed in process. The mixture is then concentrated by vacuum distillation to approximately 1/10 the original volume, whereupon hexane is added to the point of incipient precipitation and the resultant mixture chilled at 0° while precipitation occurs. The precipitate is isolated by filtration and washed with hexane, affording 1-benzylideneamine-4-(p-chloro-α-phenylbenzyl)piperidine melting at 137–139°. The product has the formula

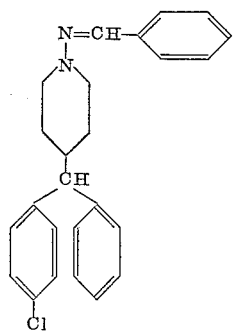

Example 6

*1-(p-hydroxybenzylideneamino)-1-diphenylmethylpiperidine.*—A mixture of 60 parts of 1-amino-4-diphenylmethylpiperidine, 28 parts of p-hydroxybenzaldehyde, and 2500 parts of benzene is heated at the boiling point under reflux for 1 hour, water being removed as formed in process. The resultant mixture is concentrated by vacuum distillation to the point of incipient precipitation (approximately 1/3 the original volume), then chilled at 0° while precipitation occurs. The precipitate is isolated by filtration and recrystallized from benzene to give 1-(p-hydroxybenzylideneamino)-1-diphenylmethylpiperidine melting at approximately 207–208°. The product has the formula

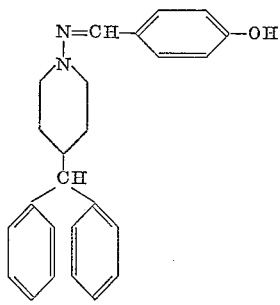

Example 7

*4-(p-chloro-α-phenylbenzyl)-1-(p-hydroxybenzylideneamino)piperidine.*—A mixture of 60 parts of 1-amino-4-(p-chloro-α-phenylbenzyl)piperidine, 25 parts of p-hydroxybenzaldehyde, and 2500 parts of benzene is heated at the boiling point under reflux for 1 hour, water being removed as formed in process. The resultant mixture is chilled at 0°, whereupon precipitation occurs. The precipitate is filtered off and washed with benzene, affording 4-(p-chloro-α-phenylbenzyl)-1-(p-hydroxybenzylideneamino)piperidine melting at 185–189°. The product has the formula

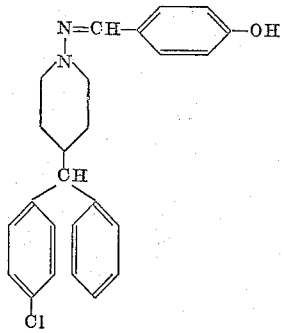

Example 8

*1-[p-(2-diethylaminoethoxy)benzylideneamino]-4-diphenylmethylpiperidine.*—A mixture of 72 parts of 1-amino-4-diphenylmethylpiperidine, 60 parts of p-(2-diethylaminoethoxy)benzaldehyde, and 5000 parts of benzene is heated at the boiling point under reflux for 1 hour, water being removed as formed in process. The resultant mixture is stripped of solvent by vacuum distillation, and the residue is taken up in 1000 parts of boiling anhydrous ethanol. The ethanol solution, on cooling to 0°, precipitates crystalline 1-[p-(2-diethylaminoethoxy)-benzylideneamino]-4-diphenylmethylpiperidine which, filtered off and washed with cold anhydrous ethanol, melts at approximately 98–99°. The product has the formula

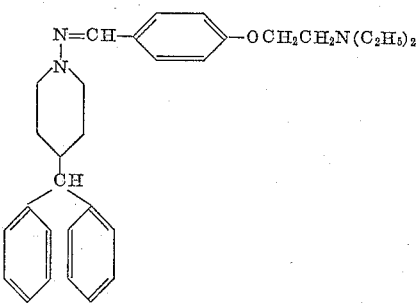

Example 9

*1-(p-cyanobenzylideneamino)-4-diphenylmethylpiperidine.*—A mixture of 100 parts of 1-amino-4-diphenylmethylpiperidine, 50 parts of p-cyanobenzaldehyde, and 5000 parts of benzene is heated at the boiling point under reflux for 1 hour, water being removed as formed in process. The mixture is then concentrated by vacuum distillation to approximately 1/10 the original volume, whereupon hexane is added to the point of incipient precipitation and the resultant mixture chilled at 0° while precipitation occurs. The precipitate is isolated by filtration and washed with hexane to give 1-(p-cyanobenzylideneamino)-4-diphenylmethylpiperidine sintering at 131° and melting at 135–138°. The product has the formula

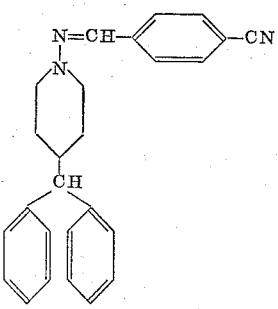

Example 10

*4 - (p-chloro-α-phenylbenzyl) - 1 - (2-hydroxy-1-naphthylidenamino)piperidine.*—A mixture of 60 parts of 1-amino-4-(p-chloro-α-phenylbenzyl)piperidine, 35 parts of 2-hydroxy-1-naphthaldehyde, and 2500 parts of benzene is heated at the boiling point under reflux for 1 hour, water being removed as formed in process. The resultant mixture is chilled to 0°, whereupon precipitation occurs. The precipitate, filtered off and washed with benzene, affords 4 - (p-chloro-α-phenylbenzyl) - 1 - (2-hydroxy-1-naphthylideneamino)piperidine softening at 220° and melting at 231–233°. The product has the formula

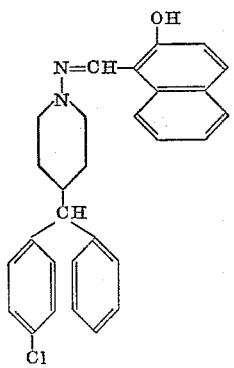

Example 11

*1 - (3,4-methylenedioxybenzylideneamino)-4-diphenylmethylpiperidine.*—A mixture of 150 parts of 1-amino-4-diphenylmethylpiperidine, 85 parts of piperonal, and 5000 parts of benzene is heated at the boiling point under reflux for 1 hour, water being removed as formed in process. The mixture is then concentrated by vacuum distillation to approximately ⅐ the original volume, whereupon hexane is added to the point of incipient precipitation and the resultant mixture chilled at 0° while precipitation occurs. The precipitate, isolated by filtration and washed with hexane, affords 1-(3,4-methylenedioxybenzylideneamino) - 4 - diphenylmethylpiperidine melting at 144–148°. The product has the formula

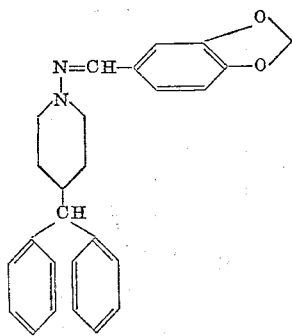

Example 12

*4 - (p - chloro - α - phenylbenzyl) - 1 - (3,4 - methylenedioxybenzylideneamino)piperidine.*— A mixture of 60 parts of 1-amino-4-(p-chloro-α-phenylbenzyl)pipcrdine, 30 parts of piperonal, 2500 parts of benzene, and 12 parts of glacial acetic acid is heated at the boiling point under reflux for 1 hour, water being removed as formed in process. The mixture is then cooled to room temperature and made alkaline with dilute aqueous sodium hydroxide, whereupon the benzene phase is separated, dried over anhydrous potassium carbonate, and concentrated by vacuum distillation to approximately ⅒ the original volume. Hexane is added to the point of incipient precipitation, and the mixture thus obtained is chilled at 0° while precipitation occurs. The precipitate, filtered off and washed with hexane, affords 4-(p-chloro-α-phenylbenzyl)-1-(3,4-methylenedioxybenzylideneamino)-piperidine melting at 144–147°. The product has the formula

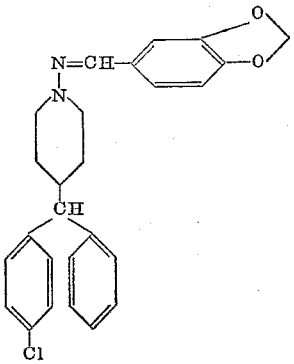

Example 13

(A) *1 - nitroso - α,α - diphenyl - 4 - piperidinemethanol.*—To a solution of 30 parts of α,α-diphenyl-4-piperidinemethanol hydrochloride in 20 parts of water and 80 parts of ethanol at 70° is added, during 45 minutes and with continuous agitation, a solution of 8 parts of sodium nitrite in 16 parts of water. Concurrently, sufficient concentrated hydrochloric acid is introduced to insure that the reaction mixture is slightly acid throughout the course of the sodium nitrite addition. Stirring is continued for 1 hour after completion of the addition, whereupon the mixture is cooled to 0° and filtered. The insoluble solids thus isolated are taken up in ether. The ether solution is washed with dilute hydrochloric acid, dried over anhydrous calcium sulfate, and stripped of solvent by distillation. The crystalline residue, which melts at 150–152° is 1-nitroso-α,α-diphenyl-4-piperidinemethanol.

(B) *1 - amino - α,α - diphenyl - 4 - piperidinemethanol hydrochloride.*—To a solution of 90 parts of lithium aluminum hydride in 12,000 parts of ether at the boiling point under reflux is added, during 30 minutes and with agitation, a solution of 450 parts of 1-nitroso-α,α-diphenyl-4-piperidinemethanol in 1200 parts of tetrahydrofuran. Agitation is continued for 30 minutes after completion of the addition and while 95 parts of water and a mixture of 71 parts of aqueous 20% sodium hydroxide with 95 parts of water are consecutively introduced. Insoluble solids are filtered off and thoroughly washed with hot tetrahydrofuran. Washings and filtrate are combined and stripped of solvent by vacuum distillation. The residue is taken up in ether, and the ether solution is made just acid with 2-propanolic hydrogen chloride. The precipitate which forms is filtered off, washed with ether, and recrystallized from aqueous ethanol to give 1-amino-α,α-diphenyl-4-piperidinemethanol hydrochloride melting at approximately 279° (with decomposition).

(C) *1 - amino - α,α - diphenyl - 4 - piperidinemethanol.*—An excess of aqueous sodium hydroxide is added to a solution of 1-amino-α,α-diphenyl-4-piperidinemethanol hydrochloride in ethyl acetate. The organic phase is separated, dried over anhydrous potassium carbonate, and stripped of solvent by vacuum distillation. The residue is 1-amino-α,α-diphenyl-4-piperidinemethanol sintering at 143°, melting at approximately 158–159°, and clearing at approximately 164°.

(D) *1 - (3,4 - methylenedioxybenzylideneamino) - α,α-diphenyl-4-piperidinemethanol.*—A mixture of 100 parts of 1-amino-α,α-diphenyl-4-piperidinemethanol, 54 parts of piperonal, 5000 parts of benzene, and 21 parts of acetic acid is heated at the boiling point under reflux for 1 hour, water being removed as formed in process. The mixture is then washed with dilute aqueous sodium hydroxide, dried over anhydrous calcium sulfate, and concentrated by vacuum distillation to approximately 1/10 the original volume, whereupon hexane is added to the point of incipient precipitation and the resultant mixture chilled at 0° while precipitation occurs. The precipitate is isolated by filtration, washed with hexane, and dried in air. The product thus isolated is 1-(3,4-methylenedioxybenzylideneamino) - α,α-diphenyl-4-piperidinemethanol melting at 148°–150°, the formula of which is

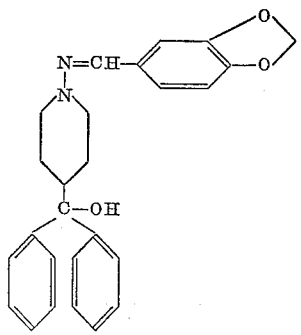

incipient precipitation and the resultant mixture chilled at 0° while precipitation occurs. The precipitate is 4-(p-chloro-α-phenylbenzyl) - 1 - (4 - pyridylmethyleneamino)piperidine which, isolated by filtration and washed with hexane, sinters at approximately 130° and melts at 132–134°. The product has the formula

*Example 14*

*4-diphenylmethyl-1-(4 - pyridylmethyleneamino)piperidine.*—A mixture of 200 parts of 1-amino-4-diphenylmethylpiperidine, 81 parts of isonicotinaldehyde, and 5000 parts of benzene is heated at the boiling point under reflux for 1 hour, water being removed as formed in process. The resultant mixture is concentrated by vacuum distillation to the point of incipient precipitation, then chilled at 0° while precipitation occurs. The precipitate is isolated by filtration and washed with benzene, affording 4-diphenylmethyl-1-(4-pyridylmethyleneamino)piperidine melting at 132–135°. The product has the formula

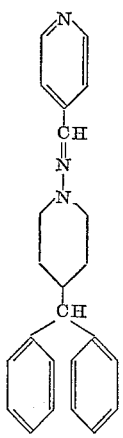

*Example 15*

*4-(p-chloro-α-phenylbenzyl) - 1 - (4 - pyridylmethyleneamino)piperidine.*—A mixture of 60 parts of 1-amino-4-(p-chloro-α-phenylbenzyl)piperidine, 22 parts of isonicotinaldehyde, and 2500 parts of benzene is heated at the boiling point under reflux for 1 hour, water being removed as formed in process. The mixture is then concentrated by vacuum distillation to approximately 1/10 the original volume, whereupon hexane is added to the point of

*Example 16*

*α,α-Diphenyl-1-(4 - pyridylmethyleneamino) - 4-piperidinemethanol.*—A mixture of 85 parts of 1-amino-α,α-diphenyl-4-piperidinemethanol, 33 parts of isonicotinaldehyde, and 5000 parts of benzene is heated at the boiling point under reflux for 1 hour, water being removed as formed in process. The mixture is then concentrated by vacuum distillation to the point of incipient precipitation (approximately 1/5 the original volume) and thereupon cooled at 0° while precipitation occurs. The precipitate is α,α-diphenyl-1-(4-pyridylmethyleneamino)-4-piperidinemethanol which, recovered on a filter and washed with benzene, melts at 177–179°. The product has the formula

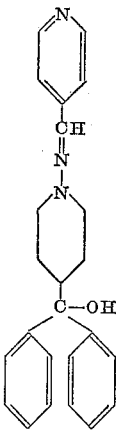

*Example 17*

*α,α - Diphenyl - 1 - (4 - pyridylmethyleneamino) - 2 - piperidinemethanol.*—A mixture of 18 parts of 1-amino-α,α-diphenyl-2-piperidinemethanol, 7 parts of isonicotinaldehyde, and 2500 parts of benzene is heated at the boiling point under reflux for 1 hour, water being removed as formed in process. The mixture is then concentrated by vacuum distillation to approximately 1/3 the original volume, whereupon hexane is added to the point of incipient precipitation and the resultant mixture cooled at 0° while precipitation occurs. The precipitate is isolated by filtration and washed with hexane, affording α,α-diphenyl - 1 - (4 - pyridylmethyleneamino) - 2 - piperidinemethanol melting at 217–219°. The product has the formula

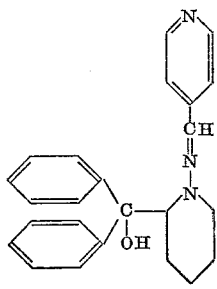

Example 18

(A) α - (p - chlorophenyl) - 1 - nitroso - α - phenyl-piperidinemethanol.—To a solution of 25 parts of α-(p - chlorophenyl) - α - phenyl - 4 - piperidinemethanol hydrochloride in 105 parts of water and 210 parts of ethanol at 70° is added, with agitation during 45 minutes, a solution of 11 parts of sodium nitrite in 25 parts of water. Sufficient concentrated hydrochloric acid is concurrently added to maintain acidity throughout the course of the sodium nitrite addition. Agitation is continued for 1 hour after the additions are complete, whereupon the mixture is cooled to 0° and insoluble solids filtered off. The solids are taken up in ether. The ether solution is filtered and stripped of solvent by distillation, leaving crystalline α - (p - chlorophenyl) - 1 - nitroso - α - phenyl-piperidinemethanol melting at 109–114° (with gas evolution).

(B) 1 - amino - α - (p - chlorophenyl) - α - phenyl - 4 - piperidinemethanol.—To a solution of 20 parts of lithium aluminum hydride in 5000 parts of ether at the boiling point under reflux is added, with agitation during 45 minutes, a solution of 105 parts of α-(p-chlorophenyl)-1-nitroso-α-phenyl-4-piperidinemethanol in a mixture of 100 parts of tetrahydrofuran and 200 parts of ether. Agitation is continued for 1 hour after the addition is complete, and thereafter while 21 parts of water and a mixture of 16 parts of aqueous 20% sodium hydroxide and 21 parts of water are consecutively introduced. Insoluble solids are filtered off, and the filtrate is concentrated by distillation to the point of incipient precipitation. It is then chilled at 0° while precipitation occurs. The precipitate is isolated by filtration and washed with cold ether. The product thus obtained is 1-amino-α-(p-chlorophenyl)-α-phenyl-4-piperidinemethanol sintering at 144° and melting at 147–150°.

(C) α - (p - chlorophenyl) - α - phenyl - 1 - (4 - pyridylmethyleneamino) - 4 - piperidinemethanol monoethanolate.—A mixture of 20 parts of 1 - amino - α - (p - chlorophenyl) - α - phenyl - 4 - piperidinemethanol, 7 parts of isonicotinaldehyde, and 1000 parts of benzene is heated at the boiling point under reflux for 1 hour, water being removed as formed in process. The resultant mixture is stripped of solvent by vacuum distillation, and the residue is taken up in a minimum of boiling ethanol. From the ethanol solution, on cooling, there precipitates crystalline α - (p - chlorophenyl)-α-phenyl-1-(4-pyridylmethyleneamino) - 4 - piperidinemethanol monoethanolate which, filtered off and recrystallized from a mixture of benzene and ethanol melts in the range 120–140°. The product has the formula

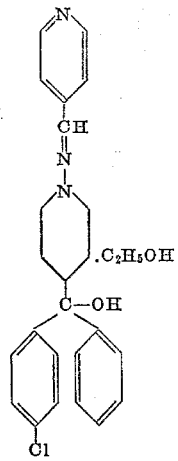

Example 19

4 - diphenylmethyl - 1 - (3 - pyridylmethyleneamino) piperidine.—A mixture of 100 parts of 1-amino-4-diphenylmethylpiperidine, 41 parts of nicotinaldehyde, and 5000 parts of benzene is heated at the boiling point under reflux for 1 hour, water being removed as formed in process. The mixture is then concentrated by vacuum distillation to approximately ⅓ the original volume, whereupon hexane is added to the point of incipient precipitation and the resultant mixture chilled at 0° while precipitation occurs. The precipitate is isolated by filtration and washed with hexane to give 4-diphenyl-1-(3-pyridylmethyleneamino) piperidine sintering at approximately 135° and melting at approximately 155–156°. The product has the formula

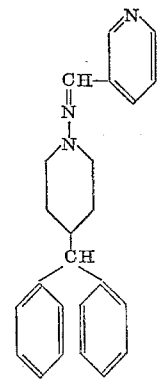

Example 20

4 - (p - chloro - α - phenylbenzyl) - 1 - (3 - pyridyl-methyleneamino)piperidine.—A mixture of 60 parts of 1-amino-4-(p-chloro-α-phenylbenzyl)piperidine, 22 parts of nicotinaldehyde, and 2500 parts of benzene is heated at the boiling point under reflux for 1 hour, water being removed as formed in process. The mixture is then concentrated to approximately 1/10 the original volume by vacuum distillation, whereupon hexane is added to the point of incipient precipitation and the resultant mixture chilled at 0° while precipitation occurs. The precipitate, recovered on a filter and washed thereon with hexane, sinters at approximately 126° and melts at 129–131°.

This material is 4-(p-chloro-α-phenylbenzyl)-1-(3-pyridylmethyleneamino)piperidine, having the formula

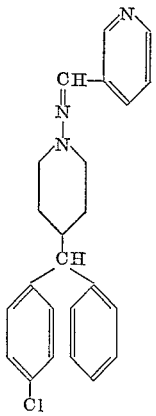

Example 21

α,α - Diphenyl - 1 - (3 - pyridylmethyleneamino) - 4 - piperidinemethanol.—A mixture of 50 parts of 1-amino-α,α-diphenyl-4-piperidinemethanol, 19 parts of nicotinaldehyde, and 2500 parts of benzene is heated at the boiling point under reflux for 1 hour, water being removed as formed in process. The mixture is then concentrated by vacuum distillation to approximately ½ the original volume, whereupon hexane is added to the point of incipient precipitation and the resultant mixture chilled at 0° while precipitation occurs. The precipitate is isolated by filtration and further purified by washing with hexane. The material thus obtained is α,α-diphenyl-1-(3-pyridylmethyleneamino)-4-piperidine methanol melting at 174–179°. The product has the formula

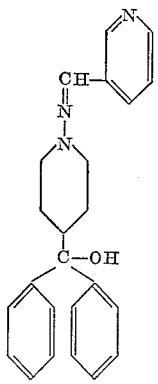

Example 22

4-diphenylmethyl - 1 - (2-pyridylmethyleneamino)piperidine.—A mixture of 100 parts of 1-amino-4-diphenylmethylpiperidine, 41 parts of picolinaldehyde, and 5000 parts of benzene is heated at the boiling point under reflux for 1 hour, water being removed as formed in process. The mixture is then concentrated by vacuum distillation to approximately ⅛ the original volume, whereupon hexane is added to the point of incipient precipitaiton and the resultant mixture chilled at 0° while precipitation occurs. The precipitate is isolated by filtration and further purified by washing with hexane to give 4-diphenylmethyl - 1 - (2-pyridylmethyleneamino)piperidine sintering at approximately 167° and melting at 182–184°.

The product has the formula

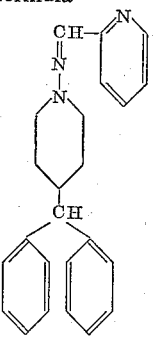

Example 23

4-diphenylmethyl-1-(4-quinolylmethyleneamino)piperidine.—A mixture of 72 parts of 1-amino-4-diphenylmethylpiperidine, 42 parts of cinchoninaldehyde, and 5000 parts of benzene is heated at the boiling point under reflux for 1 hour, water being removed as formed in process. The resultant mixture is stripped of solvent by vacuum distillation, and the residue is taken up in a minimum of boiling 2-propanol. From the 2-propanol solution, on cooling, precipitates crystalline 4-diphenylmethyl-1-(4-quinolylmethyleneamino)piperidine which, filtered off and several times recrystallized from a mixture of benzene and hexane, melts at 147–149°. The product has the formula

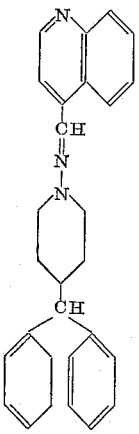

Example 24

4-diphenylmethyl - 1 - (2-thienylmethyleneamino)piperidene.—A mixture of 150 parts of 1-amino-4-diphenylmethylpiperidine, 63 parts of 2-thiophene carboxaldehyde, and 5000 parts of benzene is heated at the boiling point under reflux for 1 hour, water being removed as formed in the process. The mixture is then concentrated by vacuum distillation to approximately ⅐ the original volume, whereupon hexane is added to the point of incipient precipitation and the resultant mixture chilled at 0° while precipitation occurs. The precipitate is isolated by filtration and washed with hexane to give 4-diphenylmethyl-1-(2-thienylmethyleneamino)piperidine sintering at approximately 153° and melting at 156–158°. The product has the formula

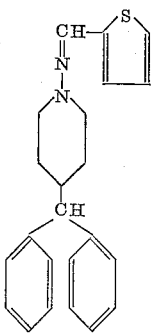

Example 25

α,α-Diphenyl-1-(2-thienylmethyleneamino) - 4 - piperidinemethanol.—A mixture of 20 parts of 1-amino-α,α-diphenyl-4-piperidinemethanol, 9 parts of 2-thiophenealdehyde, 2500 parts of benzene, and 5 parts of acetic acid is heated at the boiling point under reflux for 1 hour, water being removed as formed in process. The mixture is then washed with aqueous dilute sodium hydroxide, dried over anhydrous potassium carbonate, and concentrated by vacuum distillation to approximately 1/10 the original volume, whereupon hexane is added to the point of incipient precipitation and the resultant mixture chilled at 0° while precipitation occurs. The precipitate is isolated by filtration and washed with hexane to give α,α-diphenyl-1-(2-thienylmethyleneamino) - 4-piperidinemethanol melting at 129–131°. The product has the formula

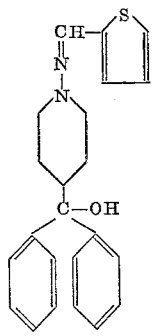

What is claimed is:
1. A compound of the formula

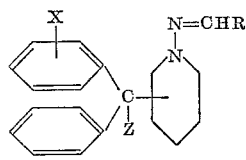

wherein X is a member of the class consisting of hydrogen and chlorine, Z is a member of the class consisting of hydrogen and hydroxyl, and R is a member of the class consisting of lower alkyl, phenyl, hydroxyphenyl, diethylaminoethoxyphenyl, cyanophenyl, 2 - hydroxy - 1-naphthyl, 3,4-methylenedioxyphenyl, pyridyl, 4-quinolyl, and thienyl.

2. 4-(p-chloro-α-phenylbenzyl) - 1 - (p-hydroxybenzylideneamino)piperidine.

3. 1-[p - (2 - diethylaminoethoxy)benzylideneamino]-4-diphenylmethylpiperidine.

4. 1-(3,4 - methylenedioxybenzylideneamino) - 4 - diphenylmethylpiperidine.

5. A compound of the formula

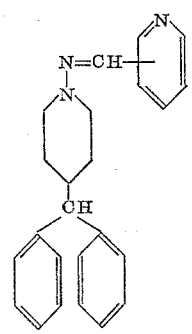

6. 4-diphenylmethyl - 1 - (4-pyridylmethyleneamino)-piperidine.

7. A compound of the formula

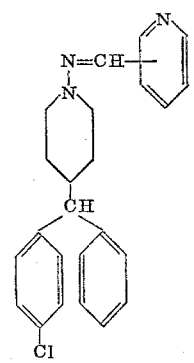

8. 4-(p-chloro-α-phenylbenzyl) - 1 - (3-pyridylmethyleneamino)piperidine.

9. A compound of the formula

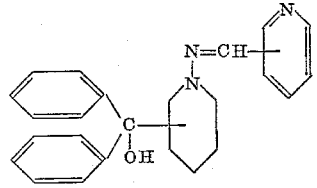

10. α,α-Diphenyl - 1 - (4 - pyridylmethyleneamino)-4-piperidinemethanol.

11. 4-diphenylmethyl - 1 - (2-thienylmethyleneamino)-piperidine.

References Cited in the file of this patent
UNITED STATES PATENTS
2,932,646    Biel _____ Apr. 12, 1960